United States Patent [19]
Kamrath et al.

[11] Patent Number: 5,715,772
[45] Date of Patent: Feb. 10, 1998

[54] PET CARRIER ABSORBENT PAD

[76] Inventors: Mark W. Kamrath; Mary D. Kamrath, both of Box 8-H, Spicewood, Tex. 78669

[21] Appl. No.: 516,164

[22] Filed: Aug. 16, 1995

[51] Int. Cl.$^6$ ............................................. A01K 1/035
[52] U.S. Cl. ........................ 119/169; 604/378; 604/384
[58] Field of Search ................................. 119/167, 171, 119/526, 850, 169; 604/378, 381, 384, 387, 389

[56] References Cited

U.S. PATENT DOCUMENTS

| | | | |
|---|---|---|---|
| 3,284,273 | 11/1966 | Prentice | 119/171 |
| 3,777,759 | 12/1973 | Oehmke et al. | 604/381 |
| 4,312,295 | 1/1982 | Harrington | 119/167 |
| 4,342,314 | 8/1982 | Radel et al. | 128/287 |
| 4,736,707 | 4/1988 | Christie | 119/169 |
| 4,800,677 | 1/1989 | Mack | 119/171 |
| 4,800,841 | 1/1989 | Yananton et al. | 119/169 |
| 4,852,518 | 8/1989 | Yananton | 119/169 |
| 4,934,316 | 6/1990 | Mack | 119/169 |
| 5,170,745 | 12/1992 | Burdette, Jr. | 119/497 |
| 5,183,655 | 2/1993 | Stanislowski et al. | 119/171 |
| 5,220,884 | 6/1993 | Townsend | 119/496 |
| 5,395,359 | 3/1995 | Nakanishi et al. | 604/378 |
| 5,401,266 | 3/1995 | Runeman et al. | 604/381 |
| 5,466,513 | 11/1995 | Wanek et al. | 604/378 |

*Primary Examiner*—Robert P. Swiatek
*Assistant Examiner*—Elizabeth Shaw
*Attorney, Agent, or Firm*—Novak Druce & Burt

[57] ABSTRACT

An absorbent pad for animal accessories. The absorbent pad includes an absorbent layer having first and second sides. A one-way moisture barrier in the form of driweave is positioned proximate to at least one side of the absorbent layer. The barrier allows moisture to pass toward the absorbent layer and resists passage of moisture away from the absorbent layer. The several layers are encased in a mesh that protects the pad and provides support thereto for maintaining its shape. The layers may be stitched together to maintain their orientation. Optionally, deodorizer and disinfectant may be applied to the absorbent layer for neutralizing odors created by absorbed animal waste, as well as sanitizing it.

19 Claims, 1 Drawing Sheet

PET CARRIER ABSORBENT PAD

FIELD OF THE INVENTION

The present invention relates generally to accessories used with animals. More particularly, it relates to absorbent pads designed to be used with pet carriers to absorb liquids that may be present in the pet carrier.

BACKGROUND OF THE INVENTION

Since ancient times, animals have been housed in cages and transported therein. In the modern age, people travel with their pets confined in pet carriers. For airline travel, pets are usually housed in pet carriers and confined for significant periods of time. During these periods, the pet may urinate in the carrier. Furthermore, the pet may be held in the carrier for extended periods after relieving itself. These conditions may create odor and health problems for the animal and others in the near vicinity.

To deal with this problem, patents have issued concerning liners or pads for absorbing pet discharges. One United States patent that has issued concerning an absorbent pad for liquids is U.S. Pat. No. 3,284,273 to Prentice for an Absorbent Pad. Prentice includes disclosure of an absorbent pad that is constructed from several layers. Two lamina layers are positioned apart by a spacer means. In between the two lamina layers is a liquid retainer. A liquid impervious film can be included beneath the bottom lamina layer to prevent liquids from discharging underneath the pad.

Another United States patent that has issued concerning an absorbent pad is U.S. Pat. No. 4,800,677 to Mack for Animal Waste Collection Pad. Mack includes disclosure of a pad having a top sheet, a backing sheet, and an absorbent pad therebetween. The top sheet is constructed from a material that allows the liquid to penetrate to the absorbent pad. The absorbent pad retains the liquid. The backing sheet is constructed from a fluid impervious film-like material, such as extruded polyethylene or polypropylene.

Examination of known absorbent pads reveals deficiencies and areas for improvement. One example is the inability of the pads to absorb liquids at a top and bottom surface. This inability stems from the use of a fluid impervious material on the bottom layer. Liquids that escape the pad and reach the floor of the carrier may pool underneath instead of being absorbed.

Another deficiency is that known pads provide no mechanism to prevent absorbed liquids from being expressed from the pad when pressure is applied thereto. When liquids are discharge onto these pads, the liquids are initially absorbed by the absorbent layer. If the pet lies or stands on the pad, its weight may force liquid from the pad onto the pet.

Still further, no known pet pads incorporate deodorizers and disinfectants to neutralize noxious odors and germs. Known pads also lack a sturdy outer covering to prevent the destruction of the pad by the pet while still allowing liquids to reach the absorbent layer. The top surface of these pads is a soft fabric material, such as felt. These pads are susceptible to being destroyed by a pet. Additionally none of the known pads have anchoring means for attaching the pad to a carrier to prevent dislodgement therefrom and ensure that the pad remains unfurled, covering the entire floor of the carrier.

Since absorbent pads of the conventional design have the above deficiencies, a present need exists for an absorbent pad having the ability to absorb liquids at a top and bottom surface. Furthermore, the pad should have a means to prevent absorbed liquid from escaping from the absorbent layer of the pad. Additionally, the pad should be designed so that a deodorizer and a disinfectant are contained therein. Also, the pad should have an outer covering that is resistant to destruction by a pet and that has anchoring means that allows the pad to be firmly secured to the floor of a pet carrier or cage.

SUMMARY OF THE INVENTION

An absorbent pad constructed according to the design of the present invention alleviates problems associated with previously known absorbent pads and provides benefits thereover. Several material layers are used in constructing the pad; these materials include fabric mesh, driweave and an absorbent medium. The absorbent pad includes specially designed layers that provide a one-way barrier to moisture. Normally, the moisture will be in a liquid state in the form of urine. The liquids will reach the absorbent layer, but the one-way moisture barriers prevent the excretion of liquids from the absorbent layer once the liquids are entrained therein. To achieve this, a driweave material is used and positioned above and below the absorbent layer. In one embodiment, the driweave material is oriented so that it surrounds the absorbent layer in an encasement thereby ensuring that no liquid escapes from the absorbent layer. In most cases, it is expected that no moisture will be allowed to escape from the absorbent layer, however, if the moisture load is very high in the layer, small amounts of moisture may escape without appreciably affecting the effectiveness of the invention.

Should a pet discharge liquid waste onto the pad, the liquids will penetrate through the driweave to the absorbent layer where the liquids will be retained therein. Should the pet lay on the pad exerting pressure thereon, the one-way moisture barriers or driweave, prevents the liquid from leaving the absorbent pad and reaching the pet. This feature enhances the retention of liquids within the pad.

Another feature of the present invention is its ability to absorb liquid at both its top and bottom surfaces. This bi-surface absorption capability is a unique improvement over known absorbent pads. An exemplary situation occurs when a pet discharges liquid at the edge of the pad while inside a carrier. The ability of the pad to absorb liquids from its bottom side as well as its top side, prevents liquids from pooling and damaging the carrier or impregnating the carrier with a noxious odor.

The absorbent pad may also include a deodorizer and/or disinfectant. The deodorizer neutralizes noxious odors caused by the waste, while the disinfectant kills germs that would otherwise multiply. Optionally, the deodorizer and disinfectant may be activated when contacted by liquid, thereby conserving the use of these substances until needed.

Another feature of the current invention is a fabric mesh surrounding the absorbent layer and moisture barriers. The fabric mesh prevents a pet, such as a dog or cat, from shredding the pad and thereby destroying the pad's effectiveness for absorbing and retaining liquids.

An additional feature of the current invention is the use of adhesive strips attached to the bottom of the pad for anchoring the pad to the floor of a cage or carrier. The strips may have a peelable plastic film covering an adhesive surface so that the pad can be sold separately from a carrier and attached thereto when desired. For versatility, the pad can be constructed to fit into any size or shape of carrier.

Stitching may be used to interconnect the layers of the pad for maintaining the orientation of the several layers during use. The stitches prevent the layers from becoming misaligned and impeding the ability of the pad to absorb and retain liquids.

This invention includes several components that have been individually selected for their combined benefits and tailored into a system that delivers superior performance as an absorbent pad. One embodiment of the present invention is an absorbent pad for use in animal accessories such as pet carriers, cages, and beds. The pad has an absorbent layer having first and second sides. A first one-way moisture barrier is positioned proximate to at least one side of the absorbent layer. The barrier allows moisture to pass toward the absorbent layer and resists passage of moisture away from the absorbent layer.

In another embodiment, the absorbent pad includes a second one-way moisture barrier positioned proximate to the second side of the absorbent layer. The first one-way moisture barrier is positioned proximate to the first side of the absorbent layer.

In a further embodiment, the pad has a fabric mesh positioned proximate to at least one of the one-way moisture barriers opposite the absorbent layer. The fabric mesh is positioned adjacent to the first and second one-way moisture barriers opposite the absorbent layer for providing support to the absorbent pad.

In yet another embodiment, the absorbent pad includes a deodorizer and/or disinfectant in the absorbent layer. The deodorizer and disinfectant are optionally activated by contact with moisture.

It is contemplated that the invention may include at least one adhesive strip coupled to the fabric mesh for anchoring the absorbent pad relative to an animal accessory. A plurality of stitches may be used for coupling the one-way moisture barriers with the absorbent layer for maintaining relative orientations therebetween.

In another embodiment, an absorbent pad for animal accessories has an absorbent layer which includes a deodorizer and a disinfectant. The absorbent pad has a first one-way moisture barrier positioned proximate to the absorbent layer for allowing moisture to pass toward the absorbent layer. The first one-way moisture barrier resists passage of the moisture away from the absorbent layer. The absorbent layer has first and second sides. The first one-way moisture barrier is positioned proximate to the first side of the absorbent layer and a second one-way moisture barrier is positioned proximate to the second side of the absorbent layer. A fabric mesh encases the first and second one-way moisture barriers for providing support to the absorbent pad. The absorbent pad includes a deodorizer and disinfectant. The deodorizer and disinfectant are activated by contact with moisture. At least one adhesive strip is coupled to the fabric mesh for anchoring the absorbent pad relative to an animal accessory upon which an animal rests.

In yet another embodiment, an absorbent pad for animal accessories has moisture retaining means for absorbing moisture therein and a barrier means for permitting moisture to pass toward the moisture retaining means and for resisting the passage of moisture from the moisture retaining means. It is contemplated that the invention includes a disinfecting means for sanitizing moisture absorbed by the moisture retaining means and a deodorizing means for neutralizing odors within the moisture retaining means.

In a further embodiment, the absorbent means is an absorbent layer including first and second sides. A first one-way moisture barrier is positioned proximate to the first side of the absorbent layer and a second one-way moisture barrier is positioned proximate to the second side of the absorbent layer. A fabric mesh encases the first and second one-way moisture barriers for providing support to the absorbent pad.

In summary, among other benefits and features described herein or apparent therefrom, the present invention includes an absorbent pad having an absorbent layer surrounded by one-way barriers which prevent the moisture from escaping the absorbent layer. It also provides a deodorizer and/or disinfectant means to cover the smell and disinfect animal discharges. A fabric mesh surrounds the pad to prevent its destruction by an animal. Still further, the present invention has adhesive strips to attach the absorbent pad to the floor of a carrier.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description and claims to relate relative orientations. Examples of such terminology include "upwardly", "downwardly", "rightwardly" and "leftwardly". The words "inwardly" and "outwardly" will refer to directions toward and away from, respectively, the geometric center of the structure being referred to. This terminology will include these words, specifically mentioned derivatives thereof, and words of similar import.

In the claims, components of the invention may be recited as being "coupled"; use of this terminology indicates that it is anticipated that elements of the invention may be connected together in such a way that there are other components interstitially located between the connected elements or that the elements may be connected in fixed or movable relation one to the other.

Figure 1:
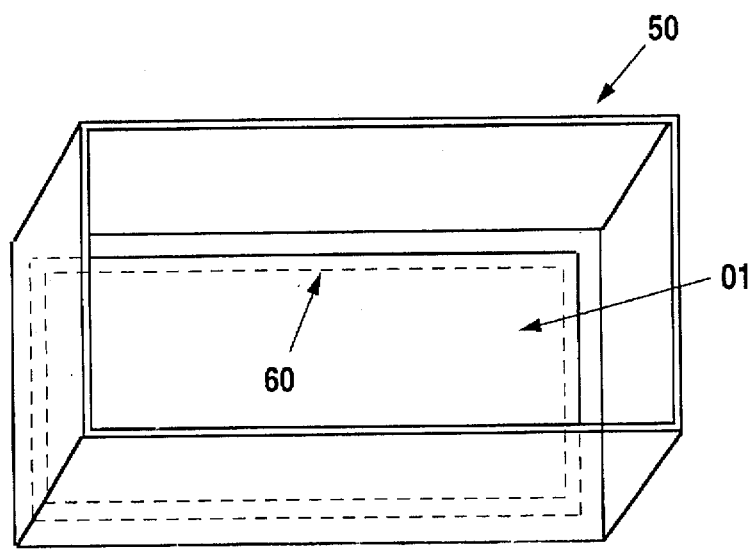
FIG. 1 is a top perspective view of the absorbent pad in an animal accessory. A portion of the absorbent pad is shown in phantom due to being obscured by the sides of the animal accessory.

Referring to FIG. 1, one embodiment of the present invention is illustrated. An absorbent pad 01 is positioned in an animal accessory 50. It should be noted that although the absorbent pad 01 is shown as being rectangular in the illustration of FIG. 1, the shape of the absorbent pad 01 can range from rectangular to circular to conform to the shape of the animal accessory 50. In the embodiment shown in FIG. 1, the animal accessory 50 is a pet carrier. It should be understood, however, that the pet accessory could be any type of device capable of accommodating a pet therein or on. Examples include carriers, cages, and beds where the pets are expected to lay. Furthermore the terms pets and animals are intended to encompass wild animals, domesticated animals, and pets such as dogs and cats.

Figure 2:
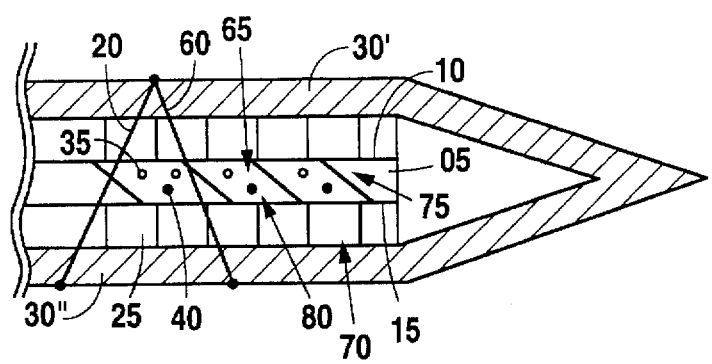
FIG. 2 is an enlarged cross-sectional view of an end portion of the absorbent pad.

FIG. 2 is an exaggerated cross-sectional view of the embodiment illustrated in FIG. 1. The absorbent pad 01 has five layers. These layers are a fabric mesh 30 having a top layer 30' and a bottom layer 30", a barrier means having a first one-way moisture barrier 20 and a second one-way moisture barrier 25, and an absorbent layer 05.

The top layer 30' is a portion of the fabric mesh 30 that covers the inner layers. In one embodiment, only the top layer 30' covers the inner layers and attaches directly to the floor of the accessory 50 for anchoring the pad thereto. The preferred embodiment has a bottom layer 30" that serves primarily the same functions as the top 30' and will be described hereinafter. The fabric mesh 30 contains small holes therethrough to allow moisture to pass through to the interior of the pad 01. These holes can vary in size as long as the fabric mesh 30 can still perform its primary functions which are providing shape and support to the absorbent pad 01 so that the inner layers maintain there orientation therein and to prevent the pad 01 from being torn apart by the pet.

The next layer toward the interior of the pad 01 below the mesh layer 30' is the first one-way moisture barrier 20. The first one-way moisture barrier 20 is constructed from a driweave material that allows moisture to pass toward the absorbent layer 05, but prevents moisture from expressing from the absorbent layer 05 out of the pad 01 at the fabric mesh 30. Thus, if an animal exerts pressure on the pad 01 by lying upon it, the one-way moisture barrier 20 prevents absorbed moisture from escaping the absorbent layer 05.

The innermost layer is a moisture retaining means 65, that in the preferred embodiment is the absorbent layer 05. The moisture retaining means 65 can be constructed from any material that absorbs moisture, such as felt, saw dust or other desiccating material. As moisture penetrates the fabric mesh 30 and first moisture barrier 20, it becomes trapped within the absorbent layer 05. The absorbent layer 05 has a first side 10 and a second side 15. In the illustrated embodiment of FIG. 2, the absorbent layer 05 is impregnated with a deodorizing means 80 in the form of a deodorizer 35 and a disinfecting means 75 in the form of a disinfectant 40. As shown in FIG. 2, the deodorizer 35 and the disinfectant 40 can be in the form of pellets. However the deodorizer 35 and the disinfectant 40 can be in other forms as well, such as a dry powder or a liquid. They may be naturally occurring such as cedar particles or they may be synthetic such as a chemical compounds. In the case of dry deodorizers 35 and disinfectants 40, the substance may be sprinkled upon the absorbent medium or layer 05. If required, the absorber 05 may be agitated to assure proper dispersement throughout. In the event the deodorizers 35 and disinfectants 40 are applied in a liquid form, they may be sprayed or otherwise dispensed upon the absorbing medium 05 in a manner assuring even treatment. The deodorizers 35 and disinfectants 40 will be of the variety that is commercially available and safe for use with animals, and optionally hypoallergenic. Furthermore, the deodorizer 35 and disinfectant 40 may be activated upon contact with moisture.

Below the adsorbent layer 05 is the second one-way moisture barrier 25. The second moisture barrier 25 allows liquid that becomes trapped between the pad 01 and the floor of the accessory 50 to travel through the second moisture barrier 25 and reach the absorbent layer 05. The second moisture barrier 25 also serves the same function as the first moisture barrier 20 in preventing liquids from escaping the absorbent layer 05 and reaching the fabric mesh 30 once absorbed. The second moisture barrier 25 can be fastened to the first moisture barrier 20 to encase the absorbent layer 05.

Figure 3:
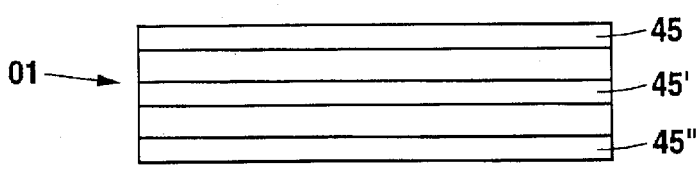
FIG. 3 is a bottom view of the absorbent pad illustrating the adhesive strips.

The bottom layer is the fabric mesh 30". The bottom of the absorbent pad 01 is illustrated in FIG. 3. Three adhesive strips 45, 45', and 45" are shown attached to the bottom of the pad 01. Though three strips 45, 45', and 45" are shown, any number of strips can be used to anchor the bottom of the pad 01 upon the floor of the accessory 50. It is contemplated that the strips 45 may include either a single or double side of adhesive. The strips 45 are attached to the bottom side of the pad 01 with at least one side of adhesive facing away from the pad 01. In a preferred embodiment, the adhesive side away from the pad is covered by shielding material that may be peeled away to expose the adhesive portion of the strip. The shielding material, such as a waxed paper strip, is attached to the pad 01 so that even after it is peeled back to expose the lower adhesive surface of the strip, it remains connected to the pad 01 during use and does not require disposal at the time of installation. This type of connection may be formed by stitching the adhesive strip, including the shielding material, to the pad's 01 lower surface.

In one embodiment, stitching 60 is used to connected the several layers and maintain them in the intended orientation described herein. It is contemplated that after the layers are properly positioned, stitching 60 may be extended therebetween so that before installation the layers do not become misaligned, and that during use the animal's activity does not change the configuration of the layered pad 01. While it is preferred that all five layers of the pad 01 be interconnected by the stitching 60, it should be understood that in alternative embodiments any two or more layers may be fastened together by the stitching 60.

To place the pad 01 into service, the shielding material of the adhesive strip 45 is peeled away to expose the adhesive. The pad 01 is then positioned with respect to the accessory 50 and anchored thereto. After use, the pad 01 is disengaged from the accessory 50 and disposed in its totality.

It is to be understood that while certain forms of the present invention have been illustrated and described herein, it is not to be limited to the specific forms or arrangement of parts described and shown. These and other variations, which will be appreciated by those skilled in the art, are within the intended scope of this invention.

What is claimed is:

1. An absorbent pad for animal accessories, comprising:
   an absorbent pad shaped and sized to fit within a bottom space of a pet container for absorbing pet urine deposited thereon by a pet positioned upon said pad;
   said pad having an absorbent layer having first and second sides;
   a first single direction moisture conveyor positioned proximate to at least one side of said absorbent layer for allowing moisture to pass toward said absorbent layer and for resisting passage of moisture out of said absorbent layer back across said single direction moisture conveyor;
   a second single direction moisture conveyor positioned proximate to said second side of said absorbent layer and said first single direction moisture conveyor positioned proximate to said first side of said absorbent layer;
   said first and second single direction moisture conveyors oriented about said absorbent layer so that moisture travels across said moisture conveyors only toward said absorbent layer: and
   said first and second single direction moisture conveyors coupled together so that at least a portion of said absorbent layer is encased therebetween.

2. The absorbent pad for animal accessories as recited in claim 1, further comprising:

a moisture permeable fabric mesh positioned about at least one of said single direction moisture conveyors opposite said absorbent layer, said fabric mesh being sufficiently strong to withstand a pet's scratching thereby protecting said absorbent pad during use.

3. The absorbent pad for animal accessories as recited in claim 1 wherein said absorbent layer includes a deodorizer for neutralizing malodors from pet urine absorbed therein.

4. The absorbent pad for animal accessories as recited in claim 1 further comprising:

at least one adhesive strip coupled to said fabric mesh for anchoring said absorbent pad relative to a pet container; and said adhesive strip having a peel-away protective covering, said covering remaining coupled to said absorbent pad after being peeled away to expose said adhesive strip.

5. The absorbent pad for animal accessories as recited in claim 1, further comprising:

a plurality of stitches coupling said single direction moisture conveyors with said absorbent layer for maintaining relative orientations therebetween.

6. A pet travel carrier having an absorbent pad coupled thereto for absorbing pet urine released by a pet contained therein, said travel carrier comprising:

a pet container having a moisture impermeable lower portion for confining waste released by a pet contained therein;

an absorbent pad shaped and sized to fit within said lower portion of said pet container for absorbing pet urine released inside said container; and said pad having an absorbent layer and a single direction moisture conveyor positioned about at least a portion of said absorbent layer, said single direction moisture conveyor allowing moisture to pass toward said absorbent layer and resisting passage of moisture out of said absorbent layer back across said single direction moisture conveyor.

7. The pet travel carrier having an absorbent pad coupled thereto for absorbing pet urine released by a pet contained therein as recited in claim 6, wherein said single direction moisture conveyor completely encases said absorbent layer so that moisture travels across said moisture conveyor only toward said absorbent layer and is prevented by said single direction moisture conveyor from being released therefrom.

8. The pet travel carrier having an absorbent pad coupled thereto for absorbing pet urine released by a pet contained therein as recited in claim 6, further comprising:

a moisture permeable fabric positioned about said single direction moisture conveyor opposite said absorbent layer, said fabric mesh being sufficiently strong to withstand a pet's scratching thereby protecting said absorbent pad during use.

9. The pet travel carrier having an absorbent pad coupled thereto for absorbing pet urine released by a pet contained therein as recited in claim 6, wherein said absorbent layer includes a deodorizer for neutralizing malodors caused by pet urine absorbed therein.

10. The pet travel carrier having an absorbent pad coupled thereto for absorbing pet urine released by a pet contained therein as recited in claim 6, further comprising:

at least one adhesive strip coupled to said absorbent pad for anchoring said absorbent pad relative to said moisture impermeable lower portion of said pet container.

11. The pet travel carrier having an absorbent pad coupled thereto for absorbing pet urine released by a pet contained therein as recited in claim 10, further comprising:

said adhesive strip having a peel-away protective covering permanently coupled to said pad at at least one location so that said covering remains coupled to said absorbent pad after being peeled away to expose said adhesive strip.

12. The pet travel carrier having an absorbent pad coupled thereto for absorbing pet urine released by a pet contained therein as recited in claim 11, further comprising:

a plurality of stitches coupling said single direction moisture conveyor with said absorbent layer for maintaining relative orientations therebetween.

13. A method for providing a pet travel carrier having a replaceable absorbent pad coupled thereto for absorbing pet urine released by a pet contained therein, said method comprising:

providing a pet container having a moisture impermeable lower portion for confining waste released by a pet contained therein; and installing an absorbent pad shaped and sized to fit within said lower portion of said pet container for absorbing pet urine released inside said container, said pad having an absorbent layer and a single direction moisture conveyor positioned about at least a portion of said absorbent layer, said single direction moisture conveyor allowing moisture to pass toward said absorbent layer and resisting passage of moisture out of said absorbent layer back across said single direction moisture conveyor.

14. The method for providing a pet travel carrier having a replaceable absorbent pad coupled thereto for absorbing pet urine released by a pet contained therein as recited in claim 13, said method further comprising:

removing a soiled absorbent pad from said carrier; and installing a replacement absorbent pad into said carrier for subsequent use.

15. The method for providing a pet travel carrier having a replaceable absorbent pad coupled thereto for absorbing pet urine released by a pet contained therein as recited in claim 28, said method further comprising:

absorbing urine released directly onto said absorbent pad through said single direction moisture conveyor into said absorbent layer; and preventing said absorbed urine from being released from said absorbent pad by said single direction moisture conveyor acting as a barrier to moisture back across said single direction moisture conveyor away from said absorbent layer.

16. The method for providing a pet travel carrier having a replaceable absorbent pad coupled thereto for absorbing pet urine released by a pet contained therein as recited in claim 15, method further comprising:

absorbing urine pooled in said lower portion of said pet container below said absorbent pad through said single direction moisture conveyor into said absorbent layer; and preventing said absorbed urine from being released from said absorbent pad by said single direction moisture conveyor acting as a barrier to moisture back across said single direction moisture conveyor away from said absorbent layer.

17. The method for providing a pet travel carrier having a replaceable absorbent pad coupled thereto for absorbing pet urine released by a pet contained therein as recited in claim 16, said method further comprising:

encasing completely said absorbent layer wherein said single direction moisture conveyor so that moisture travels across said moisture conveyor only toward said absorbent layer and is prevented by said single direction moisture conveyor from being released out of said absorbent pad once absorbed by said absorbent layer.

18. The method for providing a pet travel carrier having a replaceable absorbent pad coupled thereto for absorbing pet urine released by a pet contained therein as recited in claim 17, said method further comprising:

protecting said absorbent pad from pet scratching by covering at least partially said absorbent layer and single direction moisture conveyor with a moisture permeable fabric sufficiently strong to withstand a pet's scratching thereby protecting said absorbent pad during use.

19. The method for providing a pet travel carrier having a replaceable absorbent pad coupled thereto for absorbing pet urine released by a pet contained therein as recited in claim 18, said method further comprising:

coupling at least one adhesive strip having a peel-away protective covering to said absorbent pad for anchoring said absorbent pad relative to said moisture impermeable lower portion of said pet container;

exposing at least a portion of said adhesive strip by peeling away said protective covering therefrom: and maintaining said protective covering's couplement to said pad at at least one location so that said covering remains coupled to said absorbent pad after being peeled away to expose said portion of said adhesive strip.

* * * * *